United States Patent
Beard (10) Patent No.: US 9,028,372 B2
(45) Date of Patent: *May 12, 2015

(54) EXERCISE DEVICE WITH A LINEAR DRIVE MECHANISM

(76) Inventor: Brian Beard, Franklin, MI (US)

( * ) Notice: Subject to any disclaimer, the term of this patent is extended or adjusted under 35 U.S.C. 154(b) by 601 days.

This patent is subject to a terminal disclaimer.

(21) Appl. No.: 13/144,315

(22) PCT Filed: Jan. 15, 2010

(86) PCT No.: PCT/US2010/021100
§ 371 (c)(1),
(2), (4) Date: Jul. 13, 2011

(87) PCT Pub. No.: WO2010/083352
PCT Pub. Date: Jul. 22, 2010

(65) Prior Publication Data

US 2011/0275484 A1    Nov. 10, 2011

Related U.S. Application Data (60) Provisional application No. 61/145,204, filed on Jan. 16, 2009, provisional application No. 61/161,137, filed on Mar. 18, 2009.

(51) Int. Cl.
*A63B 22/06* (2006.01)
*A63B 69/16* (2006.01)
(Continued)

(52) U.S. Cl.
CPC .............. *B62K 3/002* (2013.01); *A63B 21/157* (2013.01); *A63B 22/205* (2013.01); *A63B 69/16* (2013.01); *A63B 2022/0641* (2013.01); *A63B 2069/164* (2013.01); *A63B 2069/168* (2013.01); *A63B 2208/0204* (2013.01); *B62M 1/30* (2013.01); *F16H 31/001* (2013.01)

(58) Field of Classification Search
USPC .................. 280/252, 221; 74/413; 482/57–65
See application file for complete search history.

(56) References Cited

U.S. PATENT DOCUMENTS 4,206,660 A * 6/1980 Brown ............................. 74/393
4,639,007 A * 1/1987 Lawrence ..................... 280/234
(Continued)

FOREIGN PATENT DOCUMENTS

EP    1214957 A1    6/2002
FR    802435 A    9/1936
(Continued)

OTHER PUBLICATIONS

International Preliminary Report on Patentability for PCT Application No. PCT/US2010/021100 mailed Jul. 28, 2011.

(Continued)

*Primary Examiner* — Loan H Thanh
*Assistant Examiner* — Jennifer M Deichl
(74) *Attorney, Agent, or Firm* — Carlson, Gaskey & Olds, P.C.

(57) ABSTRACT

An exercise device (20) includes a frame (22) and a drive mechanism (100) attached to the frame. The drive mechanism includes a first shaft (122) having a first fixed gear (128) and a second shaft (124) having a second fixed gear (130). The first fixed gear and the second fixed gear are mechanically linked to cause the first shaft to rotate in an opposite direction than the second shaft. A first linear input is mechanically linked to the first shaft and a second linear input is mechanically linked to the second shaft.

19 Claims, 11 Drawing Sheets

(51) Int. Cl.
*B62M 1/00* (2010.01)
*B62M 1/04* (2006.01)
*F16H 1/06* (2006.01)
*F16H 1/20* (2006.01)
*B62K 3/00* (2006.01)
*A63B 21/00* (2006.01)
*A63B 22/20* (2006.01)
*B62M 1/30* (2013.01)
*F16H 31/00* (2006.01)

(56) References Cited

U.S. PATENT DOCUMENTS

| | | | | |
|---|---|---|---|---|
| 5,917,995 | A * | 6/1999 | Ota | 358/1.12 |
| 6,155,584 | A * | 12/2000 | Dallet | 280/252 |
| 6,237,928 | B1 * | 5/2001 | Islas | 280/252 |
| 6,516,685 | B2 * | 2/2003 | Wang | 74/594.2 |
| 6,945,915 | B2 * | 9/2005 | Wu | 482/57 |
| 2002/0152836 | A1 | 10/2002 | Wang | |
| 2009/0048076 | A1 | 2/2009 | Irving et al. | |
| 2009/0066053 | A1 | 3/2009 | Yan | |
| 2009/0170667 | A1 | 7/2009 | Irving et al. | |

FOREIGN PATENT DOCUMENTS

| | | |
|---|---|---|
| GB | 2279918 A | 9/1995 |
| JP | 59118527 A | 7/1984 |
| WO | WO2007/139297 | 12/2007 |

OTHER PUBLICATIONS

Search Report and Written Opinion mailed on Aug. 4, 2010 for PCT/US2010/021100.

\* cited by examiner

EXERCISE DEVICE WITH A LINEAR DRIVE MECHANISM

BACKGROUND OF THE INVENTION

This application is a United States National Phase Application of PCT Application No. PCT/US2010/021100 filed on Jan. 15, 2010, which claims priority to U.S. Provisional Application No. 61/145,204 filed on Jan. 16, 2009 and U.S. Provisional Application No. 61/161,137 filed on Mar. 18, 2009.

This disclose generally relates to an exercise device. More particularly, this disclosure relates to an exercise device having a linear drive mechanism.

SUMMARY OF THE INVENTION

An exercise device includes a frame and a drive mechanism attached to the frame. The drive mechanism includes a first shaft having a first fixed gear and a second shaft having a second fixed gear. The first fixed gear and the second fixed gear are mechanically linked to cause the first shaft to rotate in an opposite direction than the second shaft. A first linear input is mechanically linked to the first shaft and a second linear input is mechanically linked to the second shaft.

BRIEF DESCRIPTION OF THE DRAWINGS

These and other features of the present invention can be best understood from the following specification and drawings, the following of which is a brief description.

DETAILED DESCRIPTION OF THE PREFERRED EMBODIMENT

Figure 1:
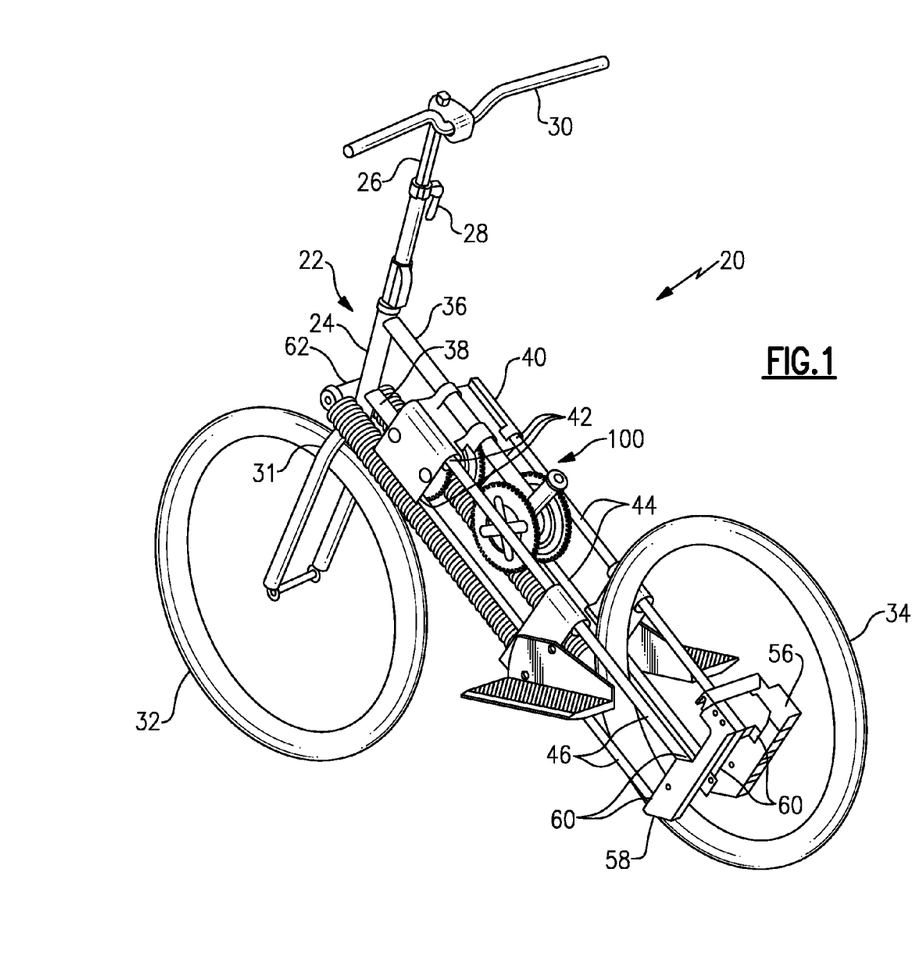
FIG. 1 is a perspective view of an example exercise device.

FIG. 1 is a perspective view of an example exercise device 20. The example exercise device 20 is a bicycle having reciprocating linear inputs designed for operation in a standing position.

The exercise device 20 includes a frame 22, a first wheel 32, and a second wheel 34. The frame 22 includes a head 24, an upper member 36, a lower member 38, a housing 40, and first and second rail housings 56 and 58. A drive mechanism 100 is located within the frame 22 for driving the exercise device 20.

The upper member 36 and the lower member 38 attach the housing 40 to the head 24. The housing 40 includes housing openings 42 for accepting a first pair of rails 44 and a second pair of rails 46. A first rail housing 56 includes rail housing openings 60 for accepting the first pair of rails 44. A second rail housing 58 includes rail housing openings 60 for accepting the second pair of rails 46.

The first wheel 32 is rotatably attached to a fork 31. The fork 31 is rotatably attached to the head 24. Handle bars 30 may be rotated to move the fork 31 relative to the head 24. A height of the handle bars 30 may be varied by engaging a latching member 28 on the frame 22 to adjust the position of the handle bar post 26. Alternatively, a height of the head or the handle bars could be varied with a hydraulic lift.

Figure 2:
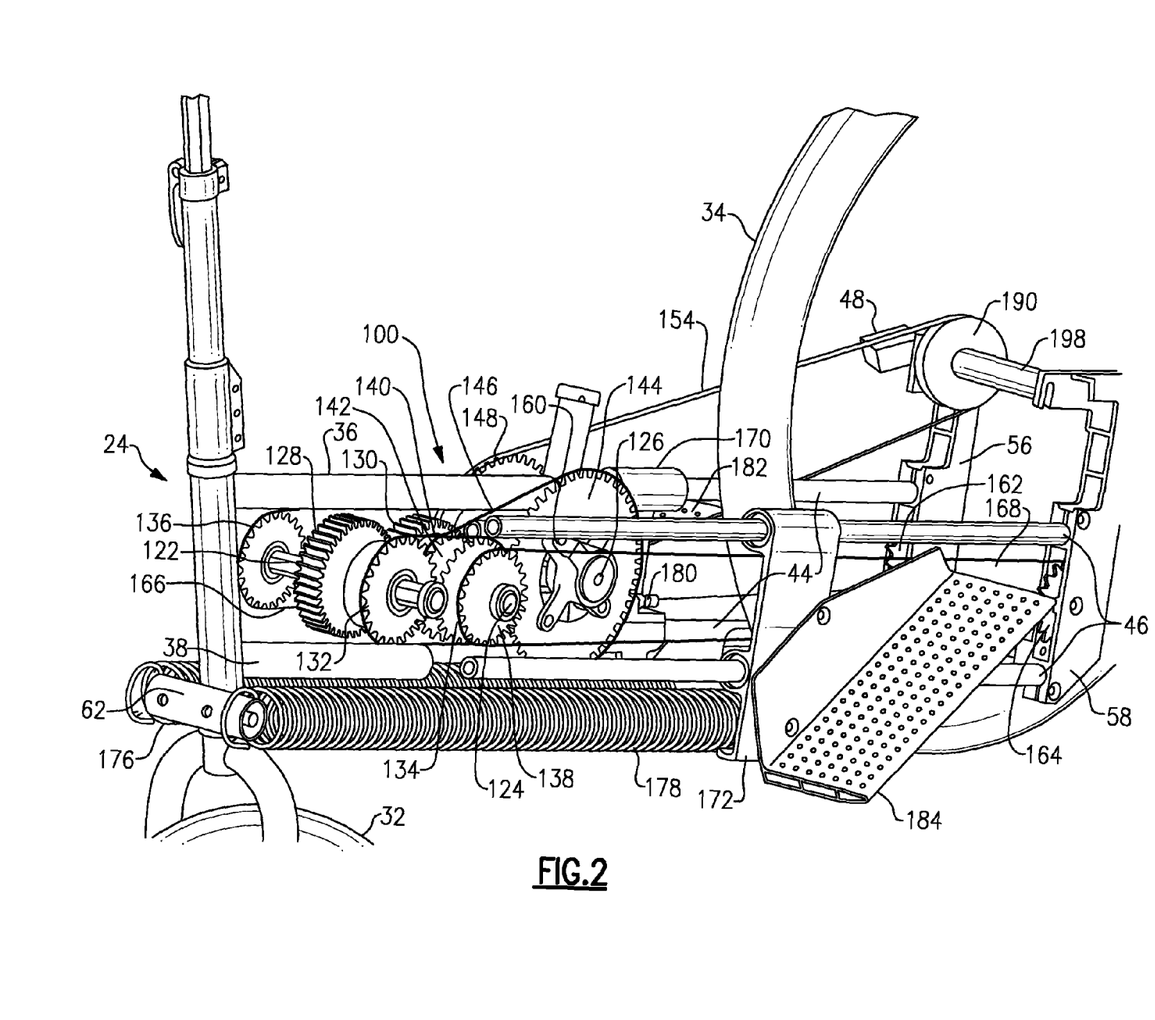
FIG. 2 is an enlarged perspective view of the exercise device of claim 1 without a housing.

FIG. 2 is a perspective view of the drive mechanism 100 located within the exercise device 20 with the housing 40 removed. The drive mechanism 100 includes a first shaft 122, a second shaft 124, and a third shaft 126. The first shaft 122 includes a first input gear 136, a first fixed gear 128, and a first one-way gear 132. The second shaft 124 includes a second fixed gear 130, a second input gear 138, a second one-way gear 134, and an attachment gear 142. The attachment gear 142 engages and moves with the second one-way gear 134. The third shaft 126 includes a drive gear 144 and an output gear 148.

The first shaft 122 is mechanically linked to the second shaft 124 by teeth on the first fixed gear 128 engaging teeth on the second fixed gear 130. The first and second fixed gears 128 and 130 may be spur gears, helical gears, or other suitable gears capable of mechanically linking the first shaft 122 and the second shaft 124 to cause the first shaft 122 and the second shaft 124 to rotate in opposite directions.

The first one-way gear 132 is mechanically linked to the second one-way gear 134 by a one-way gear attachment member 140. The attachment gear 142 is mechanically linked to the drive gear 144 by an output attachment member 146. The first and second one-way gears 132 and 134, the attachment gear 142, the drive gear 144, and the output gear 148 may be sprockets or pulleys (FIG. 4) and the one-way gear attachment member 140 and the output attachment member 146 may be a chain or a belt (FIG. 4), respectively. The one-way gears fixedly engage a shaft when rotated relative to the shaft in a first direction and freely rotate relative to the shaft in a second direction.

Figure 3:
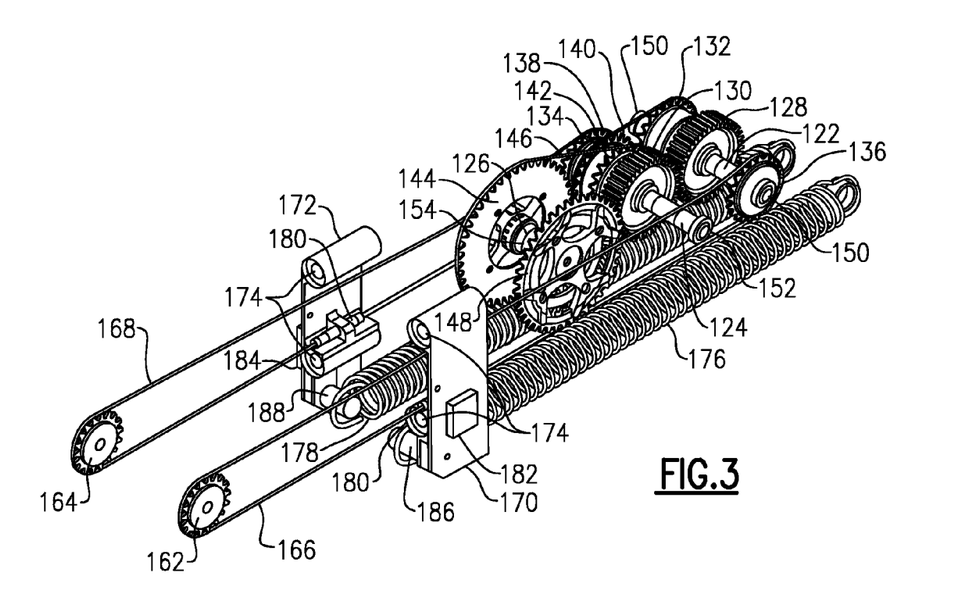
FIG. 3 is a perspective view of an example drive mechanism.

FIG. 3 is a perspective view of the drive mechanism 100. The drive mechanism 100 includes a first guide gear 162 mechanically linked to the first input gear 136 by a first input attachment member 166 and a second guide gear 164 mechanically linked to the second input gear 138 by a second input attachment member 168. A first slider 170 is attached to the first input attachment member 166 by an input attachment 180 and a second slider 172 is attached to the second input attachment member 168 by an input attachment 180. The first and second sliders 170 and 172 include an foot pedals 182 and 184, respectively, for receiving an input force and a pair of openings 174 for accepting a first and second pair of guide rails 44 and 46 (FIG. 2). The first and second guide gears 162 and 164 and the first and second input gears 136 and 138 may be sprockets or pulleys (FIG. 4) and the first and second input attachment members 166 and 168 may be chains or belts (FIG. 4), respectively.

A first end of a first spring 176 is attached to a spring attachment member 180 on the first slider 170 and a first end of a second spring 178 is attached to a spring attachment member 188 on the second slider 172.

Figure 4:
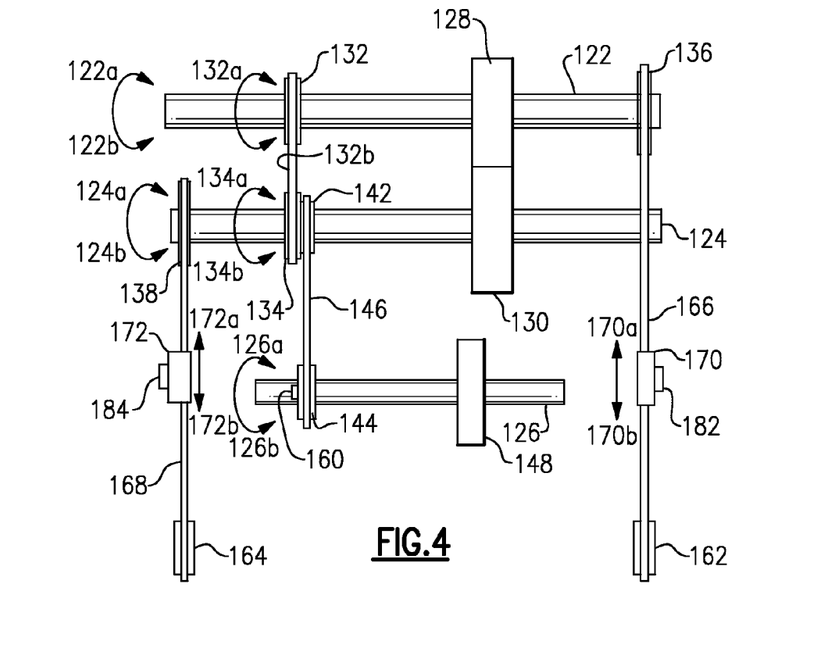
FIG. 4 is a schematic view of the drive mechanism of FIG. 3.

FIG. 4 is a schematic view of the drive mechanism 100. When the first slider 170 slides in a first direction 170a on the first pair of guide rails 44 and the second slider 172 slides in a second direction 172b on the second pair of guide rails 46, the first shaft 122 rotates in a first direction 122a and the second shaft 124 rotates in a second direction 124b. The first fixed gear 128 engages the second fixed gear 130 to cause the second shaft 124 to rotate in a second direction 124b. The first one-way gear 132 rotates in a first direction 132a, the second one-way gear 134 rotates in a first direction 134a, and the second shaft 24 rotates in a second direction 124b that is opposite to the first direction 134a. The attachment gear 142 rotates with the second one-way gear in the first direction 134a and causes the third shaft 126 to rotate in a first direction 126a.

When a first slider 170 slides in a second direction 170b on the first pair of guide rails 44 and the second slider 172 slides in a first direction 172a on the second pair of guide rails 46, the first shaft 122 rotates in a second direction 122b and the second shaft 124 rotates in a first direction 124a. The first one-way gear 132 rotates in the first direction 132a and free spins on the first shaft 122 and the second one-way gear 134 rotates in the first direction 134a. The attachment gear 142 rotates with the second one-way gear 134 in the first direction 134a and causes the third shaft 126 to rotate in a first direction 126a. A release mechanism 160 releasably engages the drive gear 144 from the third shaft 126 to allow the third shaft 126 to rotate independently of the first and second shafts 122 and 124. The release mechanism 160 in this example may be a clutch, a locking member, or another similar engaging device.

Since the first shaft 122 and the second shaft 124 rotate in opposite directions, an input to the first shaft 122 and the second shaft 124 must either be applied individually or simultaneously 180 degrees out of phase.

Figure 5:
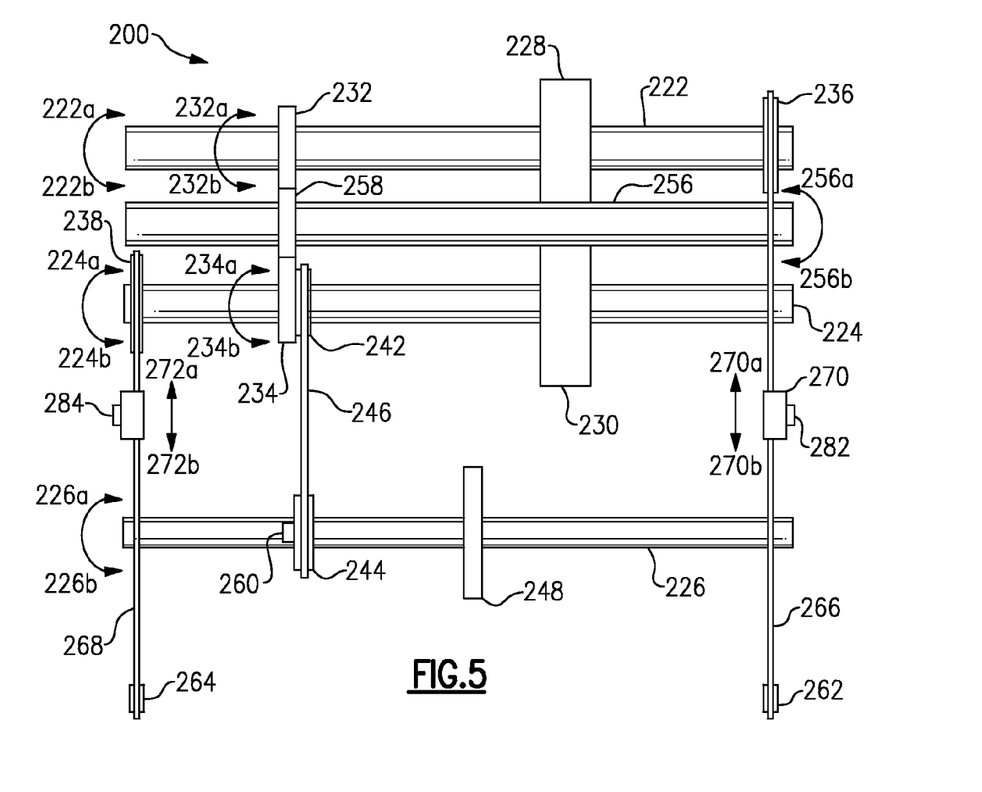
FIG. 5 is a schematic view of another example drive mechanism.
Figure 6:
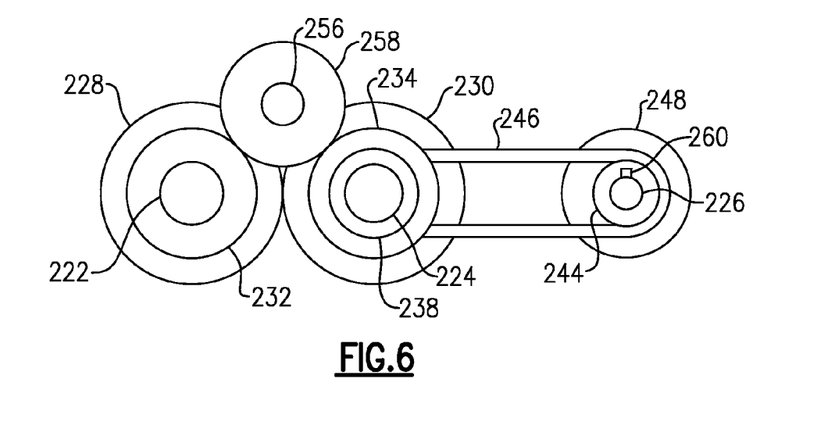
FIG. 6 is a side schematic view of the example drive mechanism of FIG. 5.

Referring to FIGS. 5 and 6, another example drive mechanism 200 includes a first shaft 222, a second shaft 224, a third shaft 226, and an intermediate shaft 256. The intermediate shaft 256 includes a fixedly attached intermediate gear 258.

When the first slider 270 slides in a first direction 270a and the second slider 272 slides in a second direction 272b, the first shaft 222 rotates in a first direction 222a and the second shaft 224 rotates in a second direction 224b. The first shaft 222 and the second shaft 224 rotate in opposite directions because teeth on a first fixed gear 228 located on the first shaft 222 engage teeth on a second fixed gear 230 located on the second shaft 224. A first one-way gear 232 rotates in a first direction 232a with the first shaft 222, the intermediate gear 258 rotates in a second direction 256b, and a second one-way gear 234 rotates in a first direction 234a. An attachment gear 242 rotates in the first direction 234a with the second one-way gear 234 causing the third shaft 226 to rotate in a first direction 226a. In this example, the first one-way gear 232, the second one-way gear 234, and the intermediate gear 233 may be spur gears, helical gears, or another similar gear.

When the first slider 270 slides in a second direction 270b and the second slider 272 slides in a first direction 272a, the first shaft 222 rotates in a second direction 222b and the second shaft 224 rotates in a first direction 224a. The first one-way gear 232 rotates in the first direction 232a and free spins on the first shaft 222. The intermediate shaft 256 rotates in the second direction 256b causing the second one-way gear 234 to rotate in the first direction 234a with the second shaft 224. The attachment gear 242 rotates in the first direction 234a with the second one-way gear 234 causing the third shaft 226 to rotate in the first direction 226a.

Figure 7:
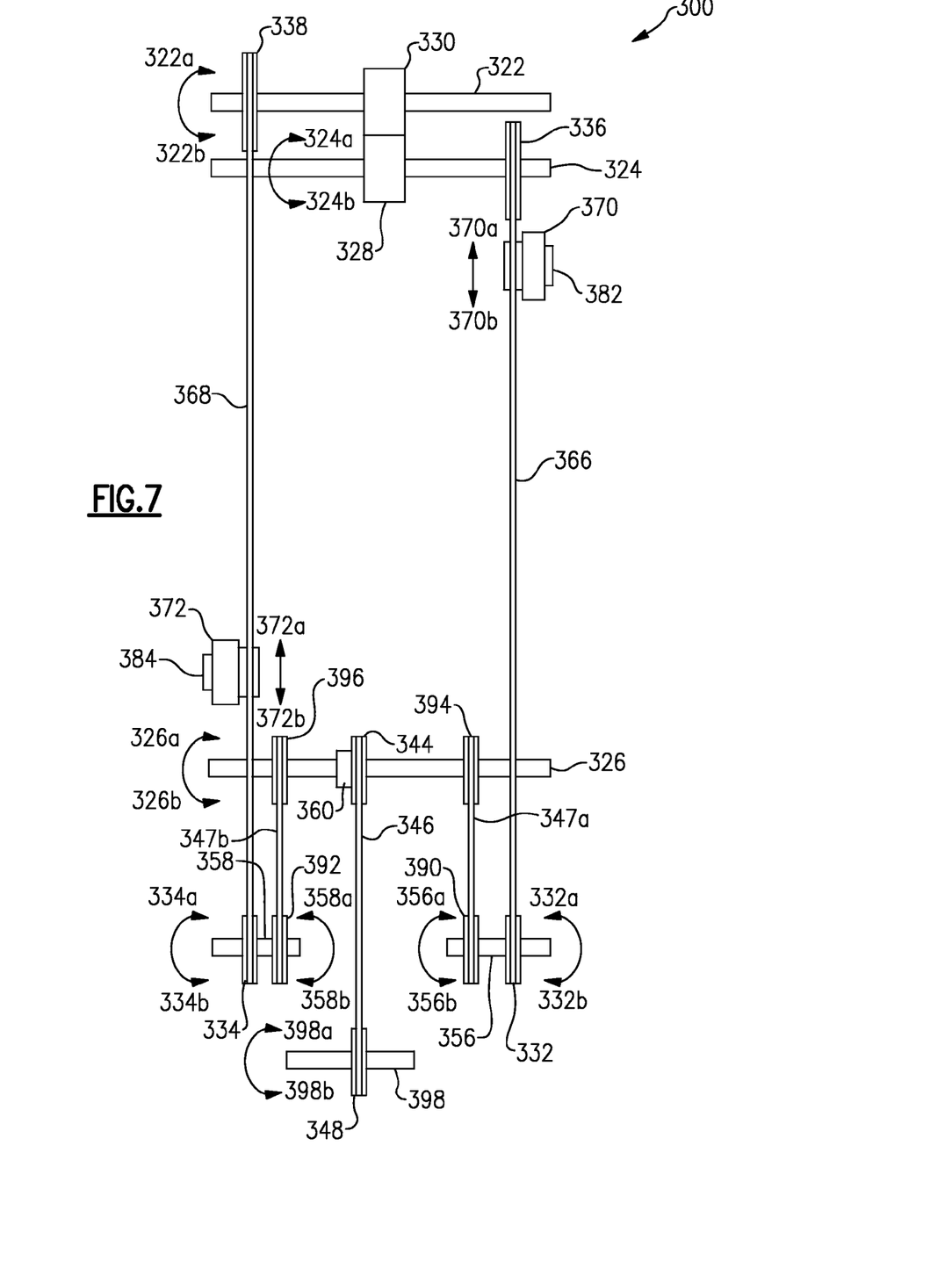
FIG. 7 is a schematic view of another example drive mechanism.

FIG. 7 is a schematic view of another example drive mechanism 300. The drive mechanism 300 includes a first shaft 324, a second shaft 322, a third shaft 326, a first intermediate shaft 356, a second intermediate shaft 358, and an axle 398. The first shaft 324 includes a first fixed gear 328 that engages a second fixed gear 330 on the second shaft 322. A first attachment member 366 mechanically links a first input gear 336 on the first shaft 324 with a first one-way gear 332 on the first intermediate shaft 356. A second attachment member 368 mechanically links a second input gear 338 on the second shaft 322 with a second one-way gear 334 on the second intermediate shaft 358.

The first and second fixed gears 328 and 330 may be spur gears, helical gears, or another suitable gear connection that would mechanically link the first shaft 324 and the second shaft 322 and cause the first shaft 324 and the second shaft 322 to rotate in opposite directions. The first and second input gears 336 and 338 and the first and second one-way gears 332 and 334 may be sprockets or pulleys and the first and second attachment members 368 and 366 may be chains or belts, respectively.

A first fixed intermediate gear 390 is attached to the intermediate shaft 356 and mechanically linked to a first fixed drive gear 394 on the third shaft 326 by a first intermediate drive attachment member 347a. A second fixed intermediate gear 392 is attached to the intermediate shaft 358 and mechanically linked to a second fixed drive gear 396 on the third shaft 326 by a second intermediate drive attachment member 347b. The first and second fixed intermediate gears 390 and 392 and the first and second fixed drive gears 394 and 396 may be sprockets or pulleys and the first and second intermediate drive attachment members 347a and 347b may be chains or belts, respectively.

The third shaft 326 includes a first drive gear 344. The first drive gear 344 includes an optional release mechanism 360 that engages or disengages the first drive gear 344 from the third shaft 326. A drive attachment member 346 mechanically links the first drive gear 344 to a second drive gear 348 on the axle 398. The first and second drive gears 344 and 348 may be sprockets or pulleys and the drive attachment member 346 may be a chain or a belt, respectively.

When a first slider 370 slides in a first direction 370a and the second slider 372 slides in a second direction 372b, the first shaft 324 rotates in a first direction 324a and the second shaft 322 rotates in a second direction 322b. The first one-way gear 332 rotates in a first direction 332a causing the first intermediate shaft 356 and the first fixed intermediate gear 390 to rotate in a first direction 356a. The first and second fixed drive gears 394 and 396 and the first drive gear 344 rotate in a first direction 326a. The second drive gear 348 and the axle 398 rotate in a first direction 398a. The second one-way gear 334 rotates in a second direction 334b and free spins on the second intermediate shaft 358 while the second fixed intermediate gear 392 and the second intermediate shaft 358 rotate in a first direction 358a.

When a first slider 370 slides in a second direction 370b and the second slider 372 slides in a first direction 372a, the first shaft 324 rotates in a second direction 324b and the second shaft 322 rotates in a first direction 322a. The second one-way gear 334 rotates in a first direction 334a causing the second intermediate shaft 358 and the second intermediate gear 392 to rotate in the first direction 358a. The first and second fixed drive gears 394 and 396 and the first drive gear 344 rotate in the first direction 326a. The second drive gear 348 and the axle 398 rotate in the first direction 398a. The first one-way gear 332 rotates in a second direction 332b and free spins on the first intermediate shaft 256 while the first intermediate gear 390 and the first intermediate shaft 356 rotate in a first rotational direction 356a.

Disengaging a release mechanism 360 will allow the axle 398 to rotate freely in either the first direction 398a or a second direction 398b.

Figure 8:
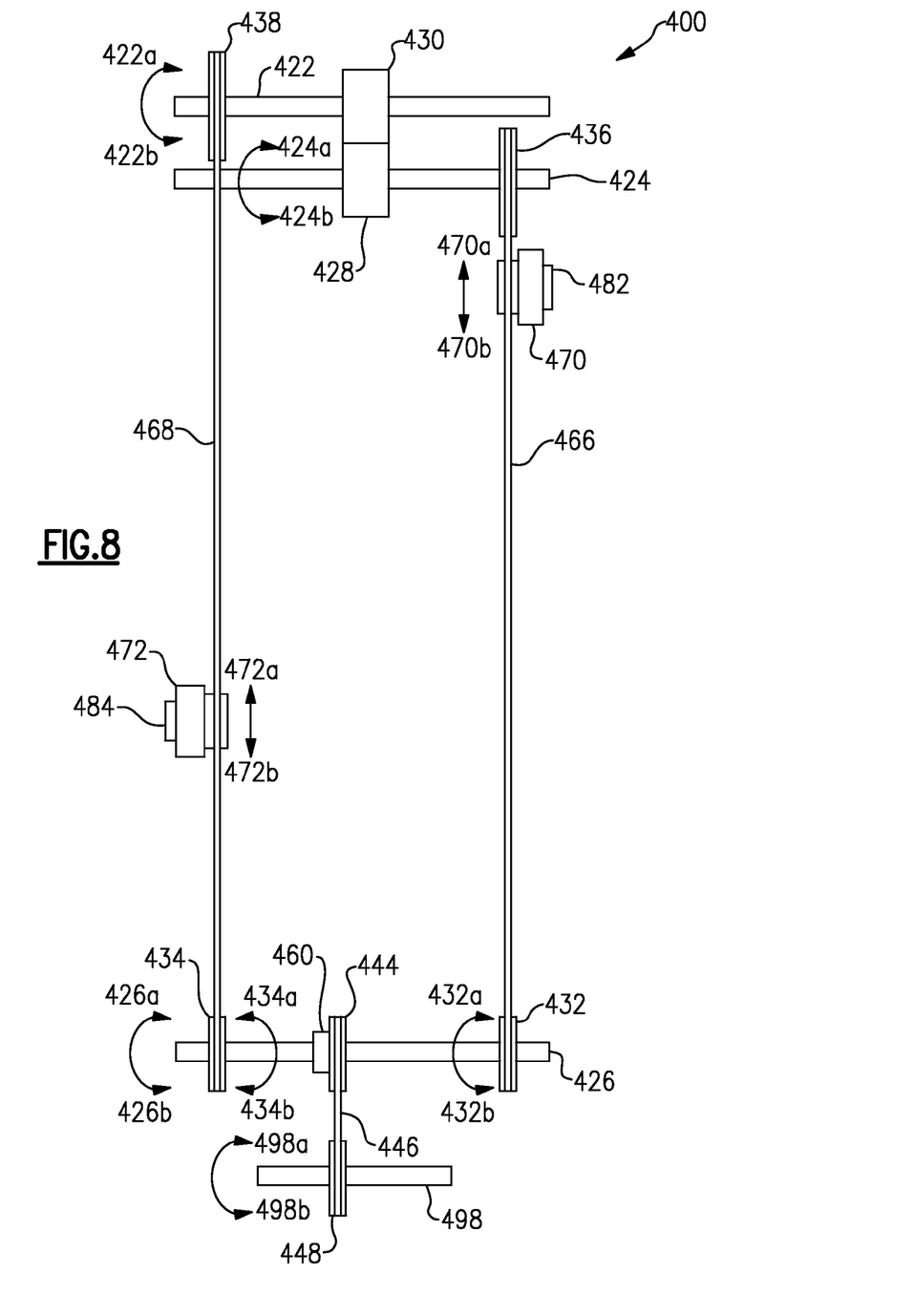
FIG. 8 is a schematic view of another example drive mechanism.

Referring to FIG. 8 another example drive mechanism 400 includes a first shaft 424, a second shaft 422, a third shaft 426, and an axle 498. The first shaft 424 includes a first fixed gear 428 that engages a second fixed gear 430 on the second shaft 422. A first attachment member 468 mechanically links a first input gear 436 on the first shaft 424 with a first one-way gear 432 on the third shaft 426. A second attachment member 468 mechanically links a second input gear 438 on the second shaft 422 with a second one-way gear 434 on the third shaft 426. The third shaft 426 includes a first drive gear 444 having an optional release mechanism 460 for releasably engaging the first drive gear 444 with the third shaft 426. The first drive gear 444 is mechanically linked to a second drive gear 448 on the axle 498 by a drive attachment member 446.

When a first slider 470 moves in a first direction 470a and a second slider 472 moves in a second direction 472b, the first shaft 424 rotates in a first direction 424a and the second shaft 422 rotates in a second direction 422b. The first one-way gear 432 rotates in a first direction 432a causing the third shaft 426 to rotate in a first direction 426a. The second one-way gear 434 rotates in a second direction 434b and free spins on the third shaft 426. The first drive gear 444 rotates in the first direction 426a causing the second drive gear 448 and the axle 498 to rotate in a first direction 498a.

When the first slider 470 moves in a second direction 470b and the second slider 472 moves in a first direction 472a, the first shaft 424 rotates in a second direction 424b and the second shaft 422 rotates in a first direction 422a. The second one-way gear 434 rotates in a first direction 434a causing the third shaft 426 to rotate in the first direction 426a. The first one-way gear 432 rotates in a second direction 432b and free spins on the third shaft 426. The first drive gear 444 rotates in the first direction 426a causing the second drive gear 448 and the axle 498 to rotate in the first direction 498a.

Figure 9:
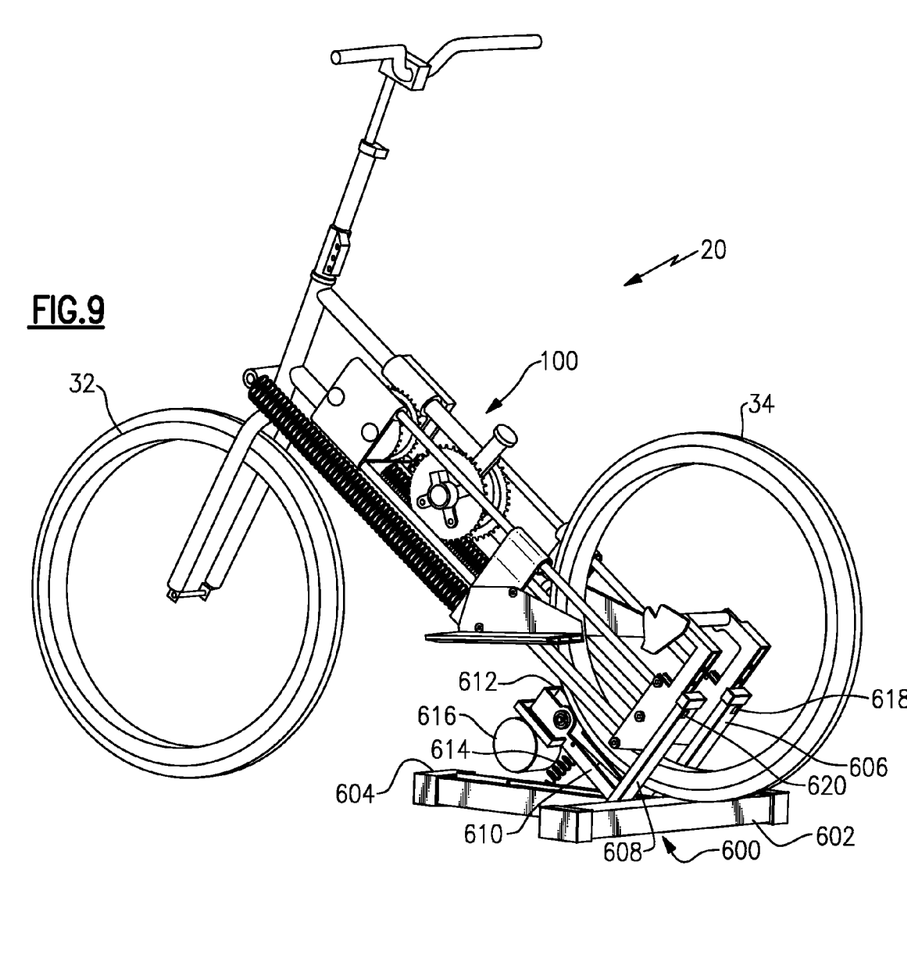
FIG. 9 is a perspective view of the exercise device of FIG. 1 located on a stand.

FIG. 9 is a perspective view of the exercise device 20 located on a stand 600. The stand 600 includes a first base member 602 attached generally perpendicular to a second base member 604. First and second generally vertical members 606 and 608 extend from the second base member 604. Alternatively, the first and second generally vertical members 606 and 608 could extend from the first base member 602 or the first and second bases members 602 and 604. The first and second generally vertical members 606 and 608 include first and second protrusion openings 618 and 620, respectively. A pivoting member 610 pivots about the second base member 604 and includes a roller 612 and a spring 614. A resistance motor 616 is attached to the pivoting member 610 and is mechanically linked to the roller 612 for resisting motion of the second wheel 34 of the exercise device 20.

Figure 10:
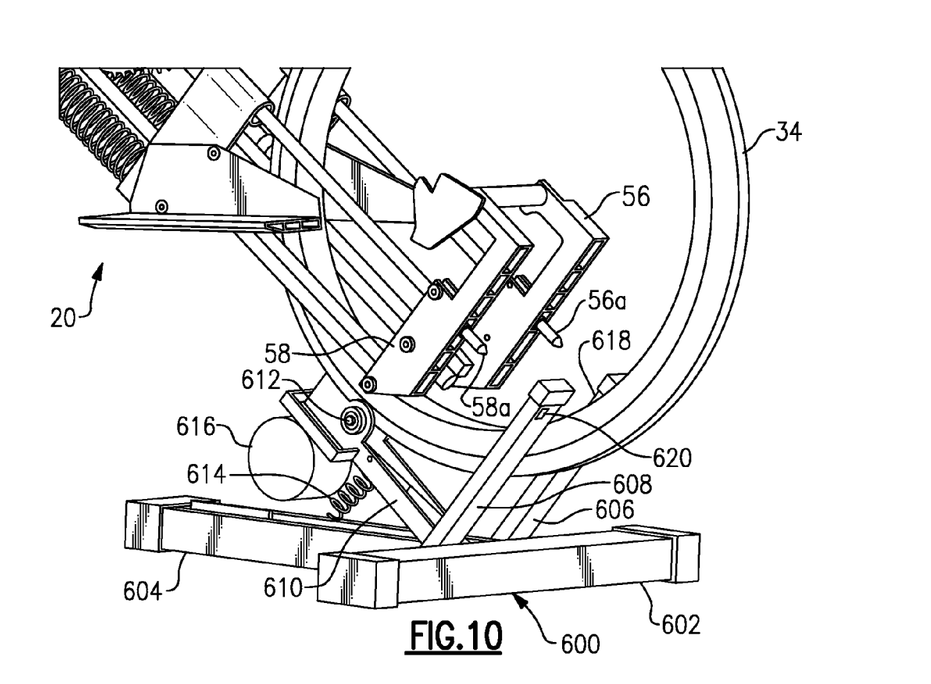
FIG. 10 is an enlarged perspective view of the exercise device of FIG. 1 located on the stand.
Figure 11:
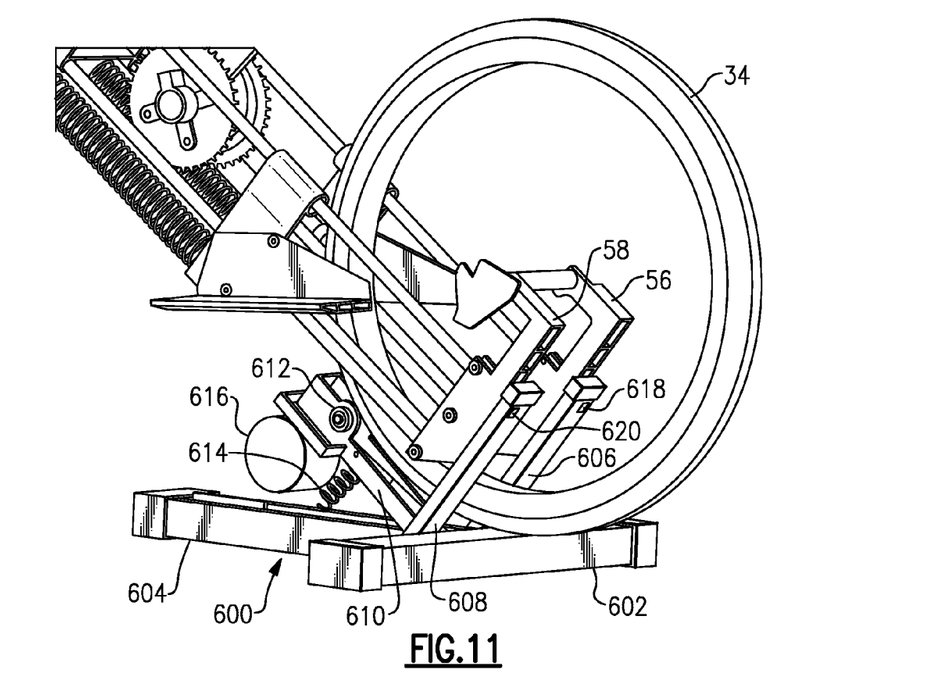
FIG. 11 is another enlarged perspective view of the exercise device of FIG. 1 located on the stand.

FIG. 10 illustrates an enlarged perspective view of the exercise device 20 and the stand 600. The exercise device 20 includes a first protrusion 56a and a second protrusion 58a extending from the first rail housing 56 and the second rail housing 58, respectively. The first and second protrusions 56a and 58a are accepted within the first and second protrusion openings 618 and 620, respectively. The exercise device 20 is mated with the stand 600 by moving the exercise device 20 towards the stand 600, engaging the second wheel 34 with the roller 614 on the pivoting member 610, and aligning the first and second protrusions 56a and 58a with the first and second protrusion openings 618 and 620 to secure the exercise device 20 with the stand 600. FIG. 11 illustrates an enlarged perspective view of exercise device 20 fully mated with the stand 600. Once the exercise device is mated with the stand 600, the exercise device 20 becomes a stationary exercise device.

Figure 12:
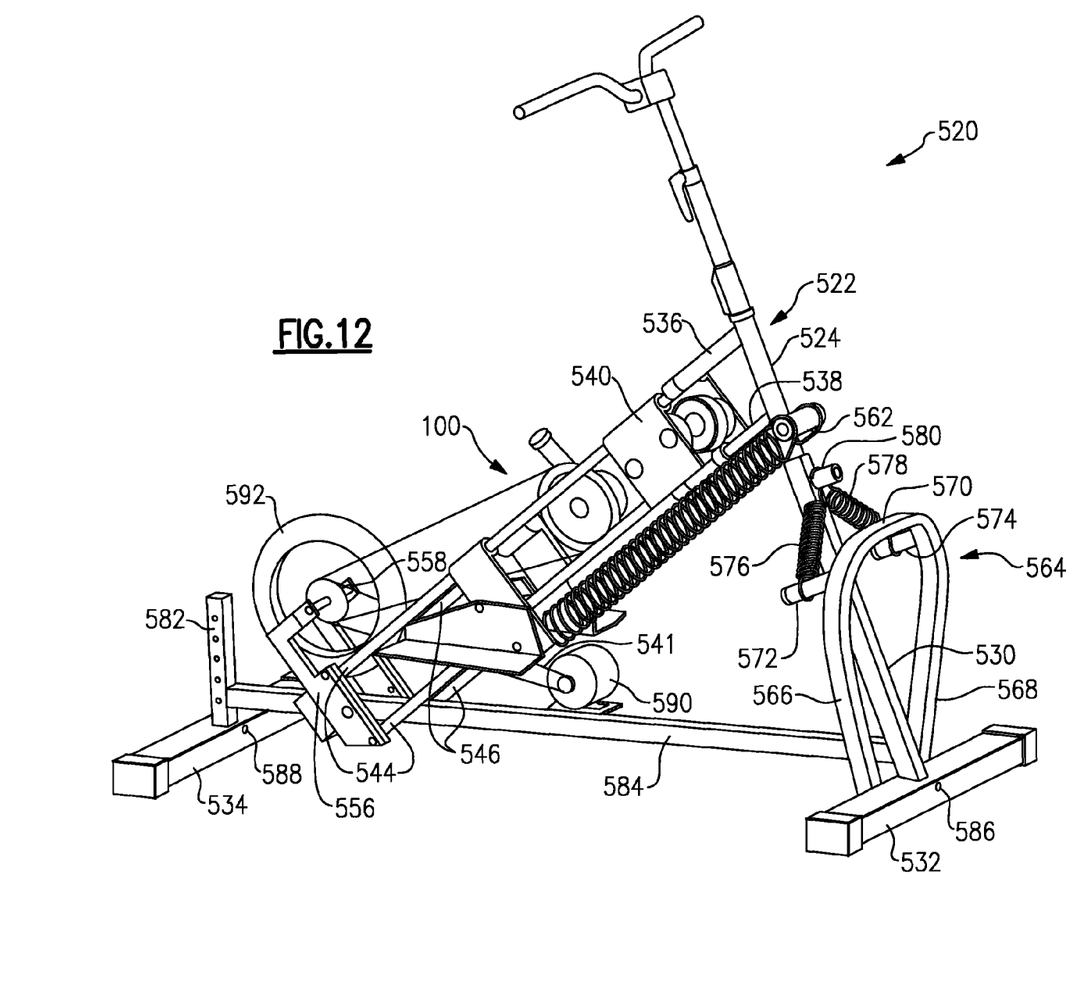
FIG. 12 is a perspective view of another example exercise device.

FIG. 12 is a perspective view of another example exercise device 520. The example exercise device 520 is a stationary exercise machine having a linear pedaling motion capable of pivoting relative to a base when a users leans from side to side.

The exercise device 520 includes a frame 522 having the drive mechanism 100 located within the frame 522. The frame 522 includes an upper member 536 and a lower member 538 connecting the head 524 with the housing 540. A front post 530 extends from the head 524. The housing 540 is attached to first and second rail housings 556 and 558 by a first and second pair of rails 544 and 546, respectively. An output of the drive mechanism 100 is mechanically linked to a wheel 592. The wheel 592 is mechanically linked to a resistance motor 590 by a resistance attachment member 591.

The exercise device 520 can pivot relative to a first base member 532 and a second base member 534. The front post 530 pivots relative the first base member 532 about a front attachment member 586 and a rear post 582 pivots about the rear attachment member 588. The front post 530 and the rear post 582 are connected by a support bar 584. The first rail housing 556 and the second rail housing 558 are attached to the support bar 584. A balancing member 564 extends from the first base member 532. The balancing member 564 includes a first upwardly extending member 566, a second upwardly extending member 568, and a horizontal member 570 connecting the first and second upwardly extending members 566 and 568. A first balancing arm 572 and a second balancing arm 574 extend from the balancing member 564. The first and second balancing arms 572 and 574 are mechanically linked to a post attachment member 580 on the front post 530 by first and second stabilizing members 576 and 578, respectively. The first and second stabilizing members 576 and 578 could either be springs, shocks, or other similar devices capable of balancing the exercise device 520.

Figure 13:
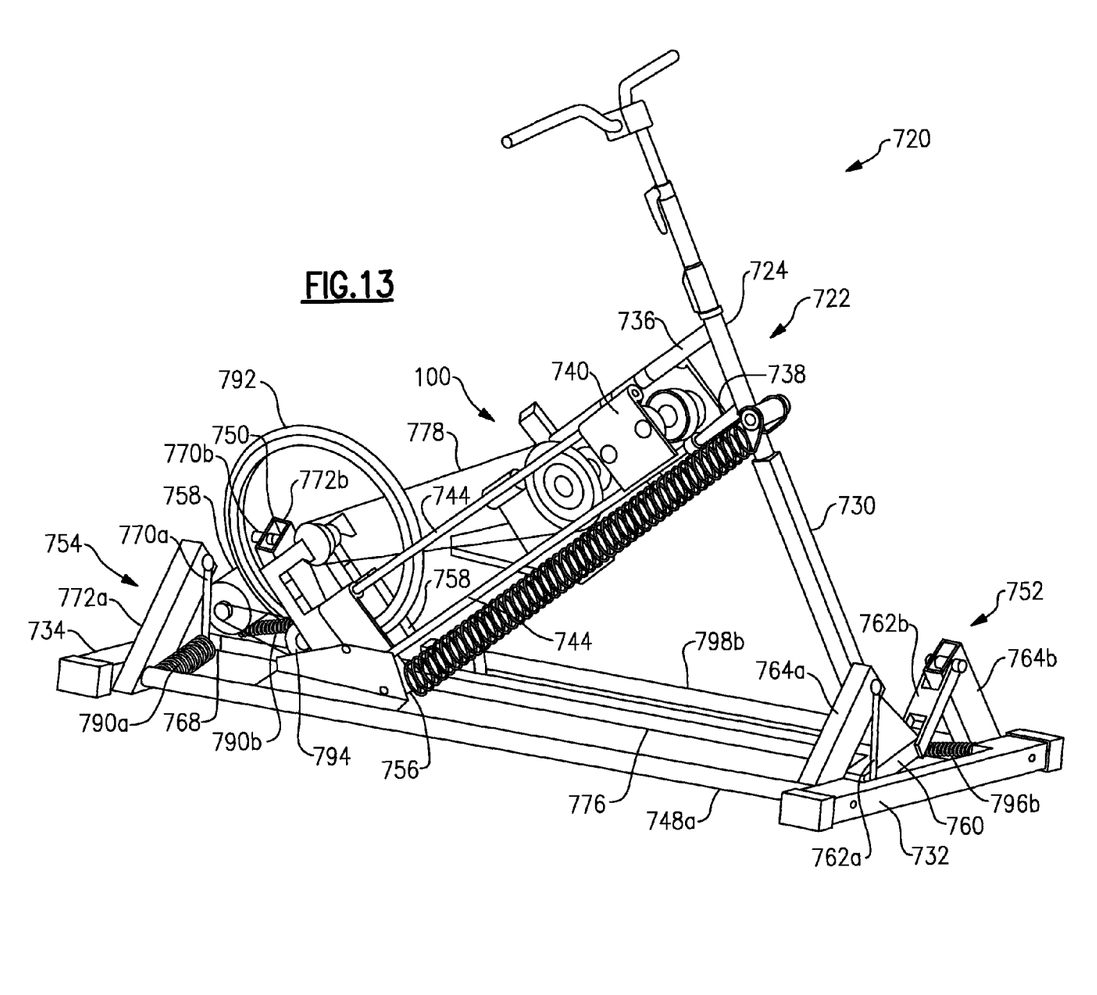
FIG. 13 is a perspective view of another example exercise device.
Figure 14:
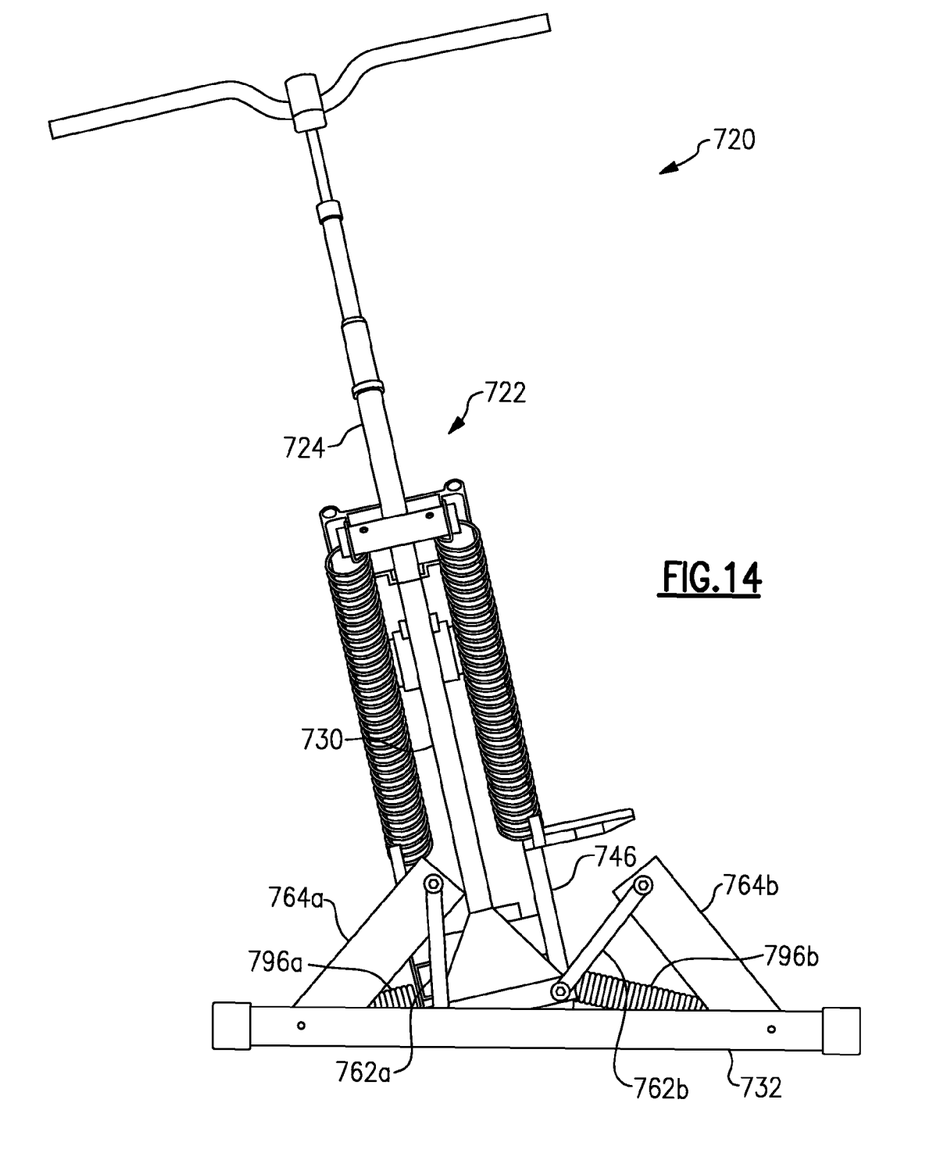
FIG. 14 is a perspective view of the example exercise device of FIG. 13.

Referring to FIGS. 13 and 14, a perspective view of another example exercise device 720. The example exercise device 720 is a stationary exercise machine having a linear pedaling motion capable of pivoting relative to a base when a users leans from side to side.

The exercise device 720 includes a frame 722 and the drive mechanism 100 located within the frame 722. The frame 722 includes a head 724 and an upper member 736 and a lower member 738 extending from the head 724. A front post 730 is attached to the head 724. A housing 740 is attached to the head 724 by the upper member 736 and the lower member 738. The housing 740 is attached to a first rail housing 756 by a first pair of rails 744 and the housing 740 is attached to a second rail housing 758 by a second pair of rails 746 (FIG. 14). An output of the drive mechanism 100 is mechanically linked to a first wheel 792 by an output attachment member 778. The first wheel 792 is attached the first and second rail housings 756 and 758 by an axle 750. The first wheel 792 engages a roller 794. A resistance motor 753 is mechanically linked to the roller 794 to resist motion of the first wheel 792.

The exercise device 720 can move relative to a first base member 732 and a second base member 734 via a first four-bar linkage 752 attached to the first base member 732 and a second four-bar linkage 754 attached to the second base member 734. The instantaneous center of the first four-bar linkage 752 and the second four-bar linkage 754 is below the frame 722. The front post 730 is attached to the first four-bar linkage 752 at a first forward horizontal member 760. A pair of generally vertical members 762a and 762b pivotally attach the first forward horizontal member 760 to a pair of supports 764a and 764b. The pair of supports 764a and 764b are attached to the first base member 732.

A support bar 776 attaches the first four-bar linkage 752 to the second four-bar linkage 754. The first rail housing 756 and the second rail housing 758 are attached to the support bar 776. The support bar 776 is attached to the first forward member 760 and the first rear horizontal member 768. A pair of generally vertical members 770a and 770b pivotally attach the first rear horizontal member 768 to a pair of rear supports 772a and 772b. The pair of rear supports 772a and 772b attach to the second base member 734. A pair of base linking members 798a and 798b link the base members 732 and 734. A first forward spring 796a attaches the vertical support 762a with the support 764a. (FIG. 14). A second forward spring 796b attaches the vertical support 762b with the support 764b. A first rearward spring 790a attaches the support 772a with the vertical member 770a. A second rearward spring 790b attaches the support 772b with the vertical member 770b. The stiffness of the springs 796a, 796b, 790a, and 790b may vary to control the motion of the exercise device 520.

Although a preferred embodiment of this invention has been disclosed, a worker of ordinary skill in this art would recognize that certain modifications would come within the scope of this invention. For that reason, the following claims should be studied to determine the true scope and content of this invention.

I claim:

1. An exercise device comprising:
   a frame; and
   a drive mechanism attached to the frame including:
      a first shaft having a first fixed gear;
      a second shaft having a second fixed gear that mechanically engages the first fixed gear to cause the first shaft to rotate in an opposite direction than the second shaft;
      a first linear input mechanically linked to the first shaft, the first linear input includes a first slider configured to slide on a first pair of linear rails;
      a second linear input mechanically linked to the second shaft, the second linear input includes a second slider configured to slide on a second pair of linear rails; and
      a first mechanical linkage between the first shaft and a third shaft having a first one-way gear and a second mechanical linkage between the second shaft and the third shaft having a second one-way gear.

2. The exercise device of claim 1 wherein the exercise device is a vehicle.

3. The exercise device of claim 1 wherein the first linear input is mechanically linked to a first spring and the second linear input is mechanically linked to a second spring.

4. The exercise device of claim 1 wherein the first one-way gear is located on the first shaft, the second one-way gear is located on the second shaft, and the second one-way gear includes an attachment gear producing a unidirectional rotational output.

5. The exercise device of claim 1 wherein the first mechanical linkage includes the second one-way gear.

6. The exercise device of claim 1, wherein the first one-way gear and the second one-way gear are fixed from motion in a first direction and free to rotate in a second direction.

7. The exercise device of claim 1 wherein the first slider includes a pair of openings that completely surround each of the first pair of linear rails and the second slider includes a second pair of openings that completely surround each of the second pair of linear rails.

8. The exercise device of claim 1, wherein the first slider is mechanically linked to a first input gear on the first shaft with a first input attachment member and the second slider is mechanically linked to a second input gear on the second shaft with a second input attachment member.

9. The exercise device of claim 8, wherein the first input member and the second input member form a loop and include at least one of a chain or a belt.

10. The exercise device of claim 1, wherein the first pair of linear rails and the second pair of linear rails are cylindrical rods.

11. The exercise device of claim 1, wherein the first shaft is configured to rotate about a first axis of rotation and the second shaft is configured to rotate about a second axis of rotation, wherein the first axis is parallel to and laterally spaced from the second axis.

12. The exercise device of claim 1, wherein the first shaft is laterally spaced from the second shaft.

13. An exercise device comprising:
   a frame; and
   a drive mechanism attached to the frame including:
      a first shaft configured to rotate about a first axis of rotation having a first fixed gear rigidly attached to the first shaft;
      a second shaft configured to rotate about a second axis of rotation having a second fixed gear rigidly attached to the second shaft, the second fixed gear is mechanically engages the first fixed gear to cause the first shaft to rotate in an opposite direction than the second shaft and the first axis of rotation is laterally spaced from the second axis of rotation; and
      a first linear input mechanically linked to the first shaft; and
      a second linear input mechanically linked to the second shaft, wherein the first linear input is mechanically linked to a first spring and the second linear input is mechanically linked to a second spring.

14. The exercise device of claim 13, including a first mechanical linkage between the first shaft and a third shaft having a first one-way gear and a second mechanical linkage between the second shaft and the third shaft having a second one-way gear.

15. The exercise device of claim 14 wherein the first one-way gear is located on the first shaft, the second one-way gear is located on the second shaft, and the second one-way gear includes an attachment gear producing a unidirectional rotational output.

16. The exercise device of claim 13, wherein the first shaft is parallel to and laterally spaced from the second shaft.

17. The exercise device of claim 13 wherein the first linear input includes a first slider configured to slide on a first pair of linear rails, the first slider includes a pair of openings that completely surround each of the first pair of linear rails and the second linear input includes a second slider configured to slide on a second pair of linear rails, the second slider includes a second pair of openings that completely surround each of the second pair of linear rails.

18. The exercise device of claim 17, wherein the first slider is mechanically linked to a first input gear on the first shaft with a first input attachment member and the second slider is mechanically linked to a second input gear on the second shaft with a second input attachment member.

19. The exercise device of claim 18, wherein the first input member and the second input member form a loop and include at least one of a chain or a belt.

* * * * *